US006493413B1

(12) United States Patent
Galioto et al.

(10) Patent No.: US 6,493,413 B1
(45) Date of Patent: Dec. 10, 2002

(54) FUEL ASSEMBLY MECHANICAL FLOW RESTRICTION APPARATUS FOR DETECTING FAILURE IN SITU OF NUCLEAR FUEL RODS IN A FUEL ASSEMBLY DURING REACTOR SHUTDOWN

(75) Inventors: Thomas A. Galioto, Kennewick, WA (US); Patrick M. O'Leary, Lynchburg, VA (US); Edward J. Ruzauskas, Kennewick, WA (US); Thomas E. Vincent, Richland, WA (US); Jerome B. Lee, Richland, WA (US); Richard G. McClelland, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 09/604,567

(22) Filed: Jun. 27, 2000

Related U.S. Application Data

(62) Division of application No. 09/325,263, filed on Jun. 3, 1999, now Pat. No. 6,345,082.

(51) Int. Cl.⁷ .............................................. G21C 17/07
(52) U.S. Cl. ....................... 376/253; 376/257; 73/45.5
(58) Field of Search ............................... 376/251, 253; 73/45.5

(56) References Cited

U.S. PATENT DOCUMENTS

| 3,762,993 A | * | 10/1973 | Jones .......................... 376/253 |
| 3,878,040 A | * | 4/1975 | Martucci |
| 4,016,749 A | * | 4/1977 | Wachter I |
| 4,039,376 A | * | 8/1977 | Wachter II |
| 4,248,666 A | * | 2/1981 | Olsson |
| 4,318,777 A | * | 3/1982 | Sujumura et al. ............ 376/253 |
| 4,416,847 A | * | 11/1983 | Saito et al. |
| 4,584,865 A | * | 4/1986 | Hutchins |
| 4,689,193 A | * | 8/1987 | van Swam et al. .......... 376/251 |
| 4,955,237 A | * | 9/1990 | Suzuki et al. |
| 4,981,045 A | * | 1/1991 | Mountford |
| 5,064,606 A | * | 11/1991 | Go .............................. 376/261 |
| 5,539,789 A | * | 7/1996 | Wachter III |
| 5,544,208 A | * | 8/1996 | Pao et al. ..................... 376/253 |
| 6,345,082 B1 | * | 2/2002 | Galioto et al. |

FOREIGN PATENT DOCUMENTS

| JP | 0021595 | * | 2/1977 | ........... G21C/17/06 |
| JP | 0034196 | * | 2/1984 | ........... G21C/17/06 |
| JP | JO 2044292 | * | 2/1990 | |
| JP | JO-3185399 | * | 8/1991 | ........... G21C/17/07 |

* cited by examiner

Primary Examiner—Michael J. Carone
Assistant Examiner—John Richardson
(74) Attorney, Agent, or Firm—Kenyon & Kenyon (57) ABSTRACT

A fuel assembly mechanical flow restriction apparatus for detecting failure in situ of nuclear fuel rods in a fuel assembly during reactor shutdown.

6 Claims, 7 Drawing Sheets

FUEL ASSEMBLY MECHANICAL FLOW RESTRICTION APPARATUS FOR DETECTING FAILURE IN SITU OF NUCLEAR FUEL RODS IN A FUEL ASSEMBLY DURING REACTOR SHUTDOWN

This is a divisional of Ser. No. 09/325,263 filed Jun. 3, 1999, now U. S. Pat. No. 6,345,082.

FIELD OF THE INVENTION

The present invention relates to nuclear fuel assemblies and, in particular, to an apparatus for detecting the failure of nuclear fuel in a nuclear fuel assembly.

BACKGROUND OF THE INVENTION

As a nuclear reactor operates and generates power, the nuclear fuel is gradually consumed and it becomes necessary at periodic intervals to inspect for failure of nuclear fuel rods composing the nuclear fuel assemblies. Such failures include a breach of the cladding of the fuel rod permitting the escape of fission products such as radioactive iodine, xenon and krypton into the reactor coolant water which circulates through the reactor core. In commercial nuclear reactors, the core comprises nuclear fuel assemblies consisting of nuclear fuel rods. The fuel rods comprise a circular or cylindrical housing commonly known as the cladding within which are stacked nuclear fuel pellets leaving a plenum space above the fuel columns and which are sealed at both ends. Failure of the cladding could result in contamination of the coolant by the escape of radioactive products from the fuel rods and which could interfere with plant operations. In practice, leak detection is not normally carried out on individual fuel rods but on fuel assemblies containing several fuel rods. Leak detection of a fuel assembly takes place by measuring fission products in a gas and/or water sample which is taken from a fuel assembly and is commonly referred to as "fuel sipping".

Some methods involve isolating a fuel assembly in a test chamber filled with water. This has the disadvantage in that the fuel assembly must be removed from the reactor core and placed within the chamber which is time consuming, particularly when conventional nuclear reactors contain several hundred nuclear fuel assemblies in the reactor core. In other methods, sipping tests are performed on nuclear fuel assemblies while they are still positioned inside the reactor core, eliminating the need for time consuming fuel assembly movements in accomplishing the testing of the fuel. The intent of the sipping tests is to detect assemblies that contain failed fuel rods so that these assemblies can be removed from the reactor and further examined or repaired. In accomplishing these sipping tests, the reactor head and upper, internals are removed, thus exposing the tops of the fuel assemblies in the core. The reactor vessel is water filled, and a continuous water coolant flow is maintained to remove decay heat from the fuel assemblies. The basic principle of the in-core sipping technique typically involves (1) restricting the coolant flow by the application of air pressure within a hood overlying the fuel assembly resulting in a temperature increase in the fuel assembly; then (2) sampling an air bubble trapped above the fuel assembly (ies) by the hood fit over the fuel assembly for gaseous fission product activity; and (3) sample the water in the fuel assembly. The temperature increase results in an internal pressure increase leading to the release of the radioactive fission products from the interior of a failed rod through the rod defect. By measuring for the presence and quantity of the radioactive isotopes in the collected gas and/or water samples taken from the assembly, the assembly can be identified as containing one or more failed fuel rods.

Thus, current techniques employed for in-core sipping depend upon achieving a fuel assembly temperature rise to release the radioactive fission products from the failed fuel rods.

However, at higher reactor shutdown coolant flow rates, the necessary temperature rise is difficult to achieve.

In order to successfully detect which assemblies have failed, it is most advantageous to selectively be able to increase the temperature of the fuel assemblies being tested, to temperatures above their normal reactor shutdown temperature. To accomplish this, the normal reactor shutdown flow rate through the fuel assemblies must be reduced or stopped during testing. The standard techniques employed in existing systems to reduce flow rates through the fuel assembly being tested involve either creating a pressurized air bubble within the test hood placed over the top of the fuel assembly or involve effectively increasing the column length of water within each fuel assembly by extending the fuel channel heights within the hood. These techniques merely add flow "resistance" to the normal reactor coolant flow in the tested channels.

The techniques currently employed to restrict flow are only partially effective. As a result, at higher levels of reactor coolant flow, the current techniques cannot restrict flow enough to permit the necessary fuel rod temperature rise to occur. This results in extended test times and/or inaccurate and unreliable test results.

It would therefore be an advantage over prior art designs to provide an apparatus for detecting failed fuel elements from a BWR, that provides an effective way to restrict coolant flow, and to thereby effect a temperature rise of the fuel rods in the fuel assembly being tested over a wide range of reactor shutdown coolant flow conditions.

SUMMARY OF THE INVENTION

In accordance with one embodiment of the present invention, a fuel assembly mechanical flow restriction apparatus is provided for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure, and a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly, and a probe assembly having at least one probe head for sampling the coolant water within the fuel assembly for detecting failure of a nuclear fuel rod in the nuclear fuel assembly, and means for causing the sealing plate of the flow restrictor to be positioned on the upper edges of the outer channel of the fuel assembly for mechanically blocking fuel assembly coolant flow from exiting the upper end of the fuel assembly and for causing the probe head to be immersed in the fuel assembly reactor coolant water within the outer channel.

In accordance with another embodiment of the present invention, a fuel assembly mechanical flow restriction apparatus is provided for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure, and a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly, and a probe assembly having at least one probe head for sampling the coolant water within the fuel assembly for detecting failure of a nuclear fuel rod in the nuclear fuel assembly, and means for causing the sealing plate of the flow restrictor to be positioned on the upper edges of the outer channel of the fuel assembly for mechanically blocking fuel assembly coolant flow from exiting the upper end of the fuel assembly and means for causing the probe head to be immersed in the fuel assembly reactor coolant water within the outer channel.

DETAILED DESCRIPTION OF THE INVENTION

Figure 1:
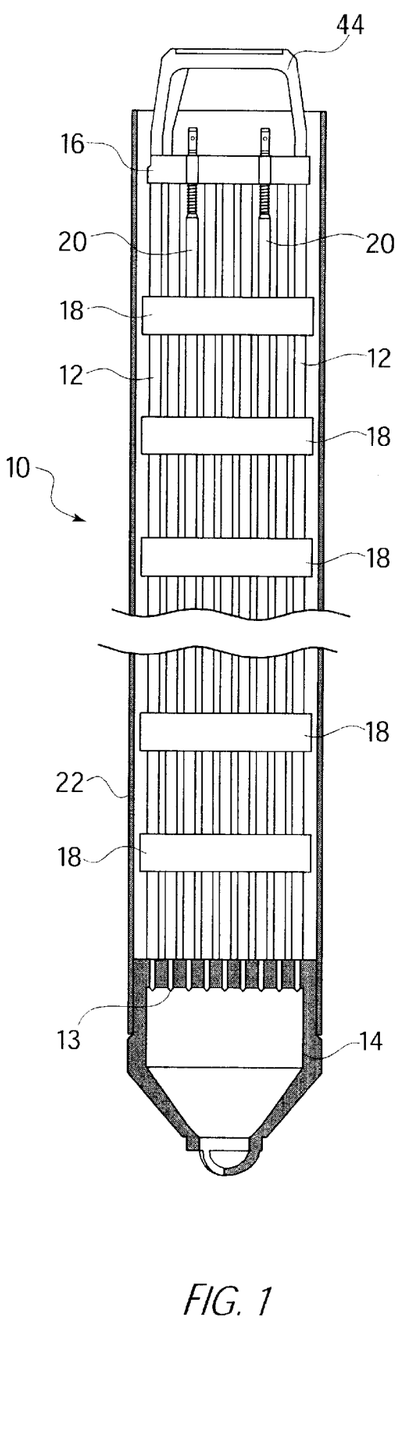
FIG. 1 is a side elevational view, partly in section, of a BWR fuel assembly.
Figure 2:
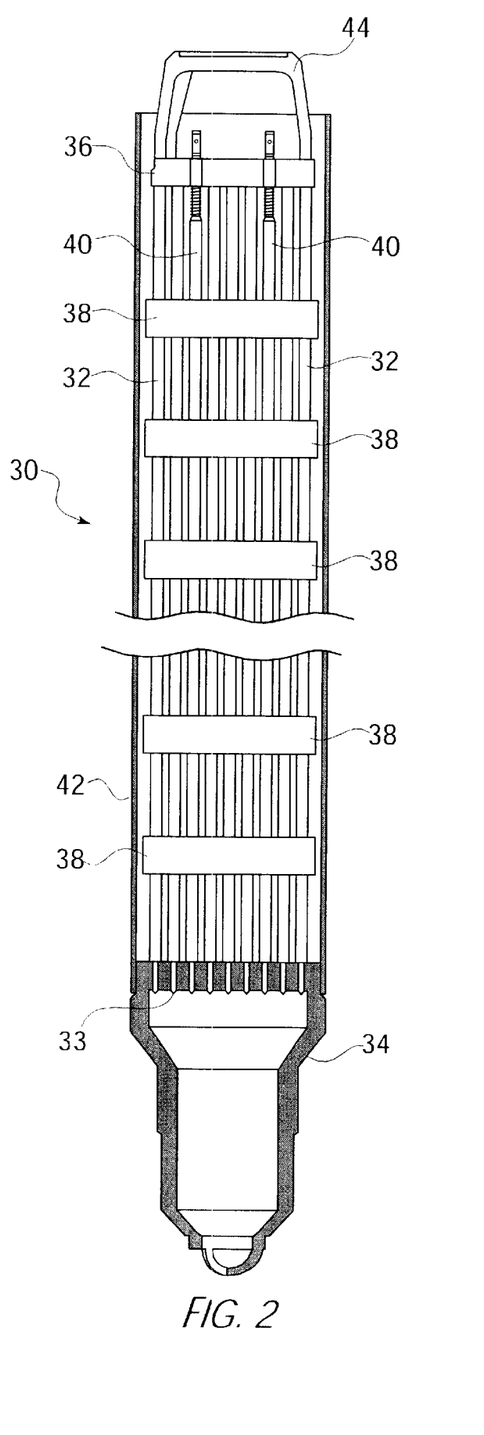
FIG. 2 is a side elevational view, partly in section, of another BWR fuel assembly.
Figure 7A:
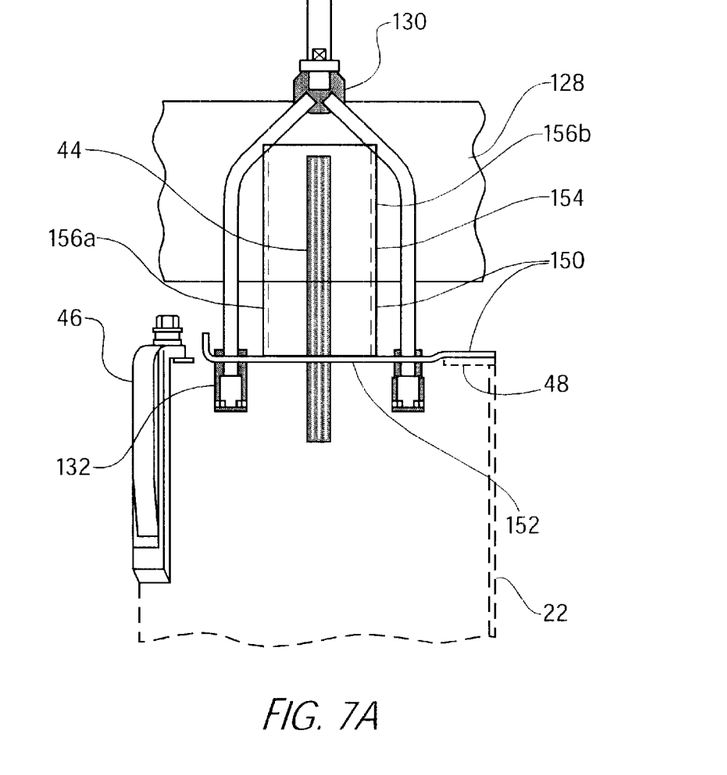
FIG. 7A is a side elevational view, partly in cross section of an enlarged view of one of the probe assemblies and Flow Restrictor shown in FIG. 6 during testing of a fuel assembly.
Figure 7B:
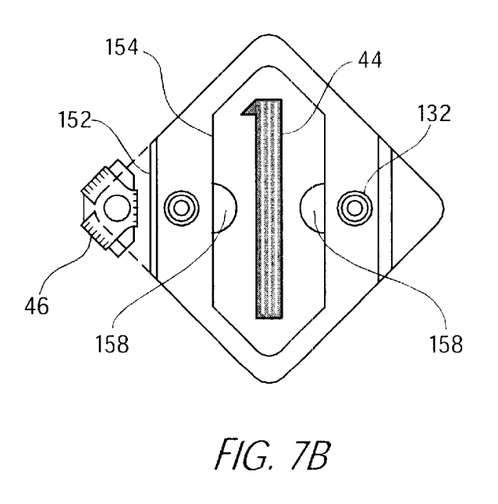
FIG. 7B is a top view of FIG. 7A.

Referring to FIG. 1, a boiling water reactor (BWR) fuel assembly design typically used in reactors in the U.S. is generally shown at 10 having elongated nuclear fuel rods 12 which are supported between a lower tie plate 14 and upper tie plate 16. Each fuel rod generally includes a zirconium alloy tube within which are nuclear fuel pellets. Lower tie plate 14 and upper tie plate 16 are connected structurally by tie rods 20 positioned within the array of fuel rods. A plurality of spacer grids 18 provide intermediate support of the fuel rods 12 over the length of the fuel assembly and maintain them in spaced relationship while restraining them from lateral vibration. Outer channel 22 completely surrounds the fuel assembly on all four sides and extends from the lower tie plate to the upper tie plate. Not shown in FIG. 1 or FIG. 2 are channel spring clip hardware 46 used to provide separation of one fuel assembly from another while in the reactor core, and flow channel gusset plate 48 (see FIG. 7). A boiling water reactor fuel assembly of a design used in reactors outside the U.S. and typically in Europe is generally shown at 30 in FIG. 2 and similarly has fuel rods 32 supported between a lower tie plate 34 and upper tie plate 36, tie rods 40, spacer grids 38 and outer channel 42.

A typical boiling water reactor has a reactor core comprising many of fuel assemblies 10 disposed in a fixed geometric array.

Figure 3:
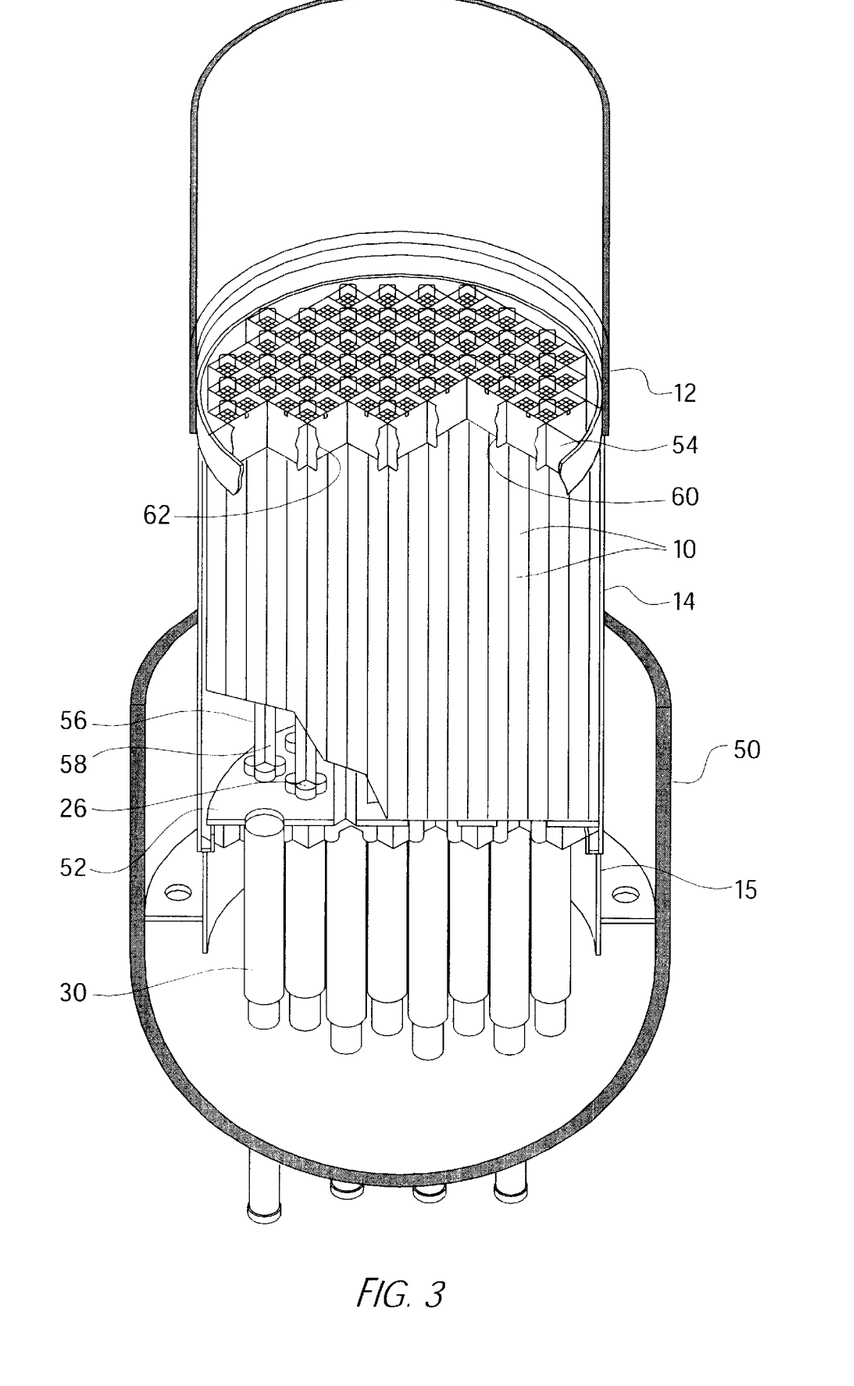
FIG. 3 is a schematic illustration inside of a reactor pressure vessel for a BWR during refueling operations showing the nuclear fuel assemblies positioned in the reactor core between the core support plate and the top guide structure.
Figure 4:
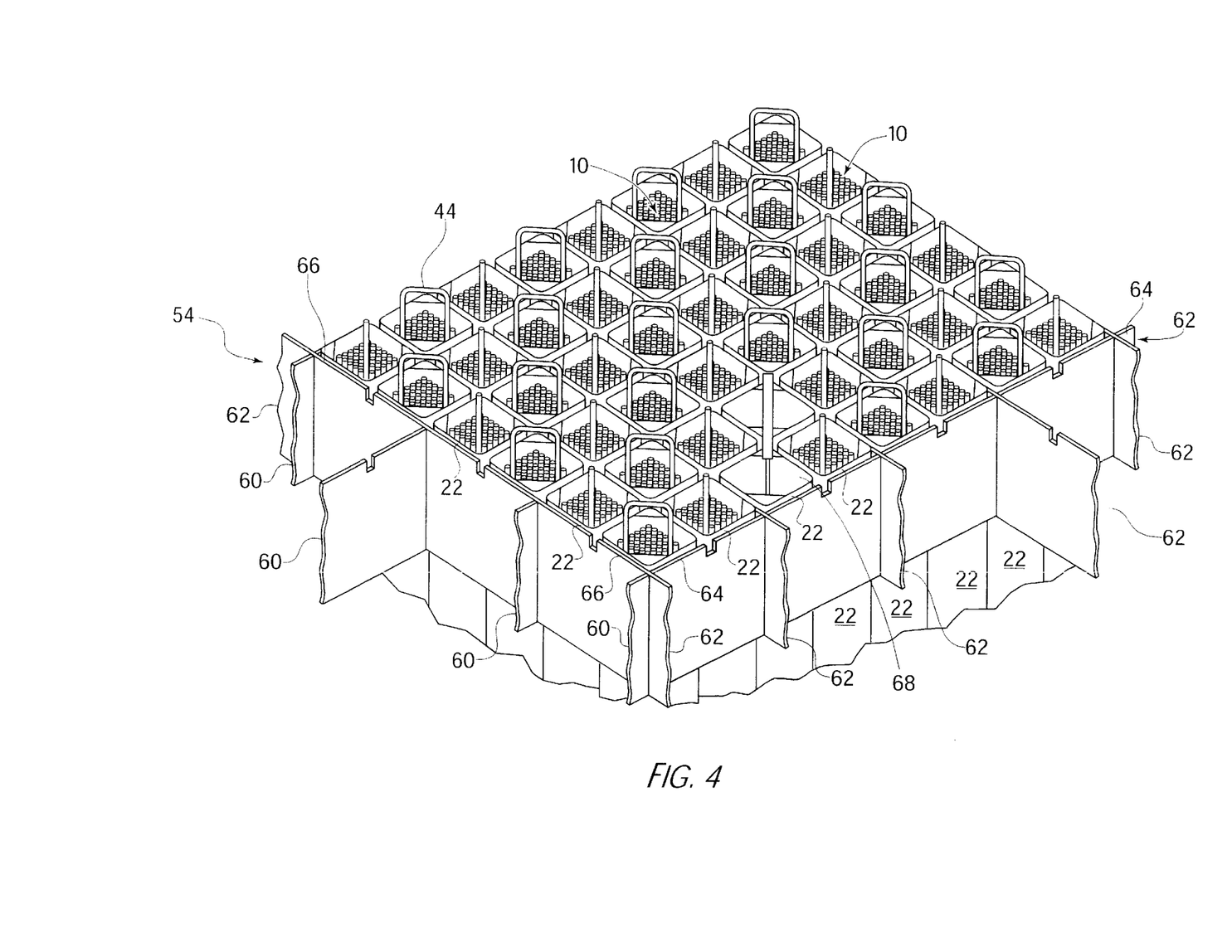
FIG. 4 is an enlarged schematic illustration of a portion of the top guide structure in FIG. 3 and showing the tops of the nuclear fuel assemblies extending into openings formed by the grid members of the top guide structure.

Referring to FIG. 3, a reactor pressure vessel 50 of a boiling water reactor is shown during shutdown and refueling operations with nuclear fuel assemblies 10 positioned underwater within the reactor core between the core support plate 52 and the top guide structure 54 and with the fuel assembly control rods 56 which have cruciform cross-sectionally shaped blades 58 containing neutron absorbing material inserted into the gaps or spaces between fuel assemblies 10. Most of the control rods 56 have been eliminated for clarity of illustration. Referring to FIG. 4 which is an enlarged view of a portion of the top guide structure 54 and the top portions of the nuclear fuel assemblies 10 shown in FIG. 3, top guide structure 54 is comprised of a set of parallel grid members 60 and a second set of parallel grid members 62 which intersect to form a lattice of rectangular shaped fuel cells. The top surfaces or edges of grid members 60 and 62 are 64 and 66 respectively. The top portions of four nuclear fuel assemblies 10 and one control rod (not shown) pass through and are supported by and within each fuel cell. During refueling operations, when less than four fuel assemblies are positioned within a fuel cell in the top guide structure, a blade guide 68 is inserted in the place of the removed fuel assemblies to provide support and guidance for the control rod blades. Blade guide 68 is comprised of two dummy fuel assemblies oriented at each of their corner edges and whose handles are connected by a cross member which has a similar handle.

In accordance with the present invention, a Fuel Assembly Mechanical Flow Restriction Apparatus 100 enhances the performance of existing wet sipping test methods. It does this by providing a mechanical blockage restriction to the fuel assembly coolant flow exiting the top of the fuel assembly channel. The blockage restriction force can be applied by pneumatic (air pressure) means, as described below, or by other mechanical means (spring force, hydraulics, etc.). This blockage allows the fuel rods in the fuel assembly to increase in temperature and thereby to more readily provide for release of failed rod internal gas/soluble fission products, and permits this temperature rise under higher reactor shutdown coolant flow conditions than has previously been achieved by prior art methods or apparatuses. Prior art solutions to create a needed temperature rise (relying either on only the interior hood gas pressure or on extending the channel height with a device to raise the fluid head pressure over the fuel assembly flow channel) are not as effective in stopping flow through the assembly. The Fuel Assembly Mechanical Flow Restriction Apparatus blocks flow, and the resisting pressure provided can be adjusted by varying the probe assembly air pressure which is used to extend (lower) the unit over the fuel assembly.

Figure 5:
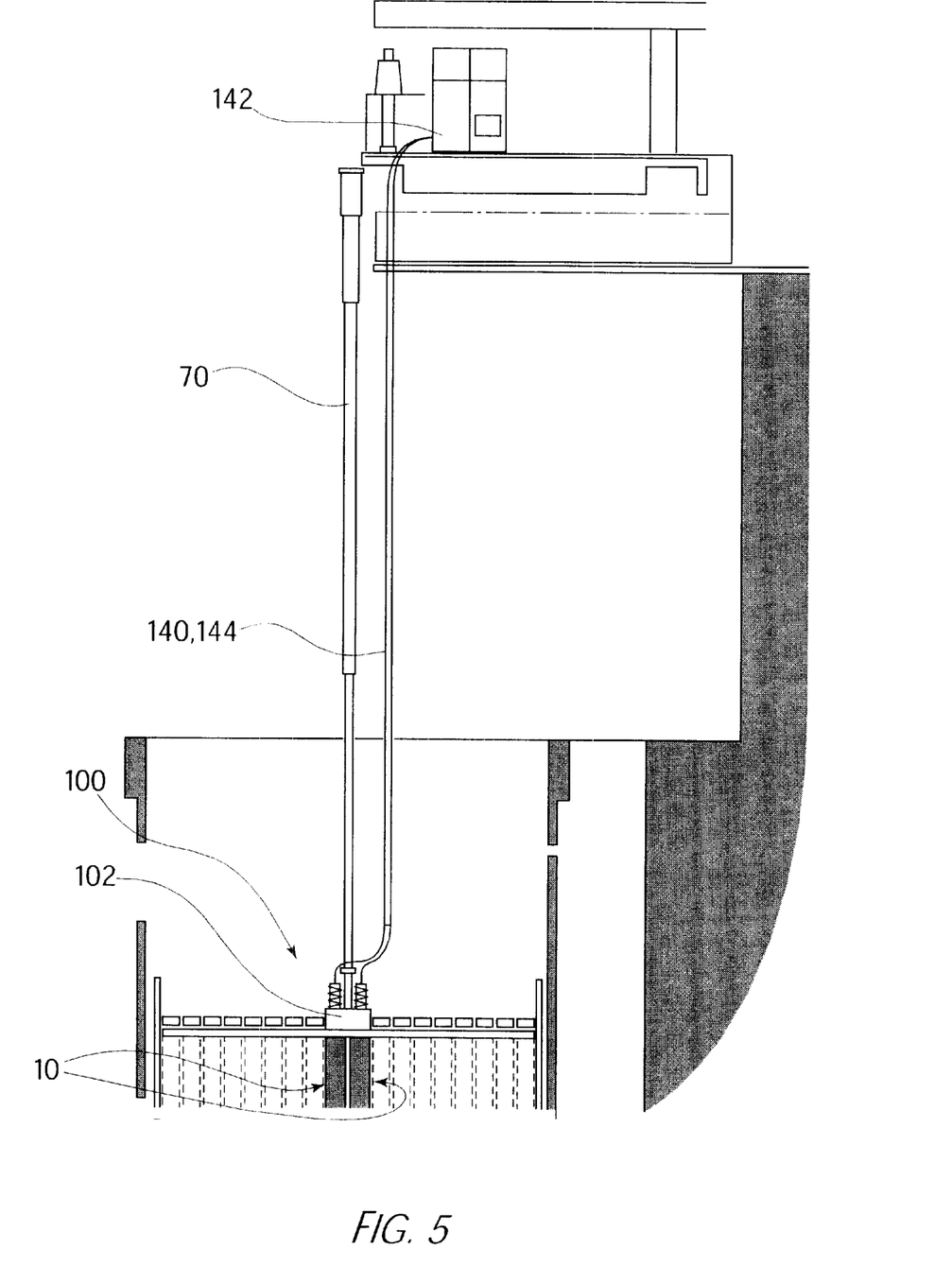
FIG. 5 is a schematic illustration of the present invention positioned over eight fuel assemblies in the reactor core during reactor shutdown or refueling operations.

The operation of the Fuel Assembly Mechanical Flow Restriction Apparatus occurs after a testing hood 102 is positioned over the tops of fuel assemblies 10 to be sipped as shown in FIG. 5.

Figure 6:
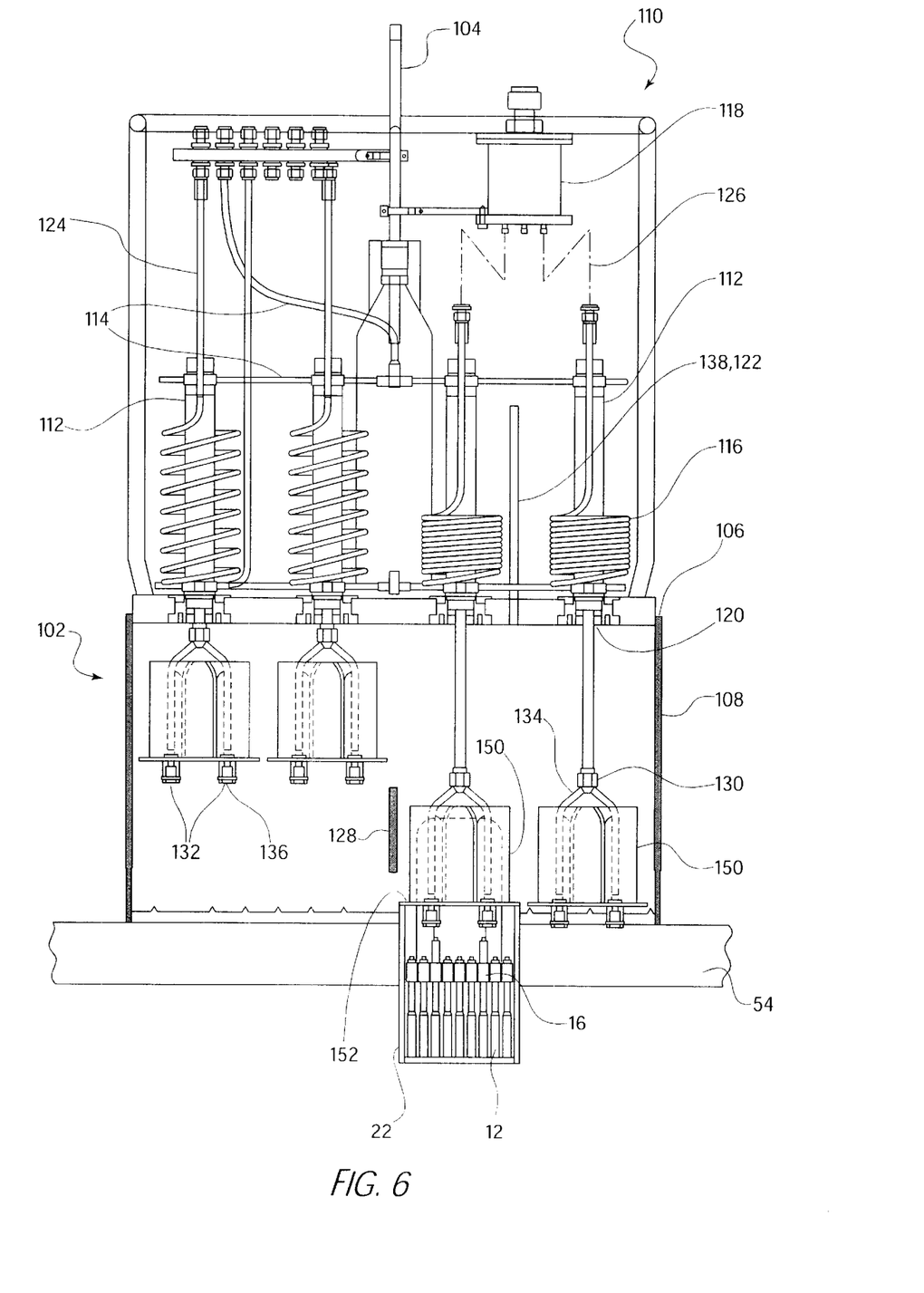
FIG. 6 is a side elevational view of the present invention positioned over eight fuel assemblies during reactor shutdown or refueling operations.

In accordance with the present invention, the Fuel Assembly Mechanical Flow Restriction Apparatus includes an eight-position testing hood assembly 102 as illustrated in FIG. 6. Other units for 16-position, four-position, three-position, two-position, and one-position testing hood assemblies or for virtually any number of fuel assemblies are similar in operation, and will not be specifically described here. The Fuel Assembly Mechanical Flow Restriction Apparatus can inspect eight fuel assemblies simultaneously. The mast 70 of fuel handling machine (not shown) grapples the testing hood bail 104 which is designed to match the configuration of the fuel assembly lifting bail 44. The eight-position unit is lowered into the reactor vessel 50 and placed over the tops of the fuel assemblies 10 to be tested as shown in FIG. 6. Only one fuel assembly is shown for clarity of illustration. The testing hood 102 consists of the top plate 106 and four vertical side plates 108 welded to it to form a rectangular box structure with an open bottom. Attached to the top plate 106 is a protective tubular structure 110 which protects the working mechanisms of Fuel Assembly Mechanical Flow Restriction Apparatus 100 above top plate 106. The working mechanisms of Fuel Assembly Mechanical Flow Restriction Apparatus 100 consist of air cylinder assemblies 112 with fixed 114 and flexible 116 air lines, a thermocouple junction box 118, seal assemblies 120, gas sample lines 122, water sample lines 124, and thermocouple lines 126.

A stiffening plate 128 provides additional structural strength and rigidity to the testing hood 102. Probe assembly 130 is attached to air cylinder assembly 112 and branches into two separate sampling port branches 134. Probe heads 132 attached to each of sample port branches 134 allow water to be sampled at two diagonally positioned points inside the fuel assembly flow channel 22. One of the two probe heads 132 also includes a thermocouple 136 which is positioned such that the tip of the thermocouple 136 is located just inside the probe head 132. Probe assembly 130 is attached to a Flow Restrictor 150 at the probe heads 132. FIG. 6 shows four of the eight probe assemblies 130 inside hood 102. Of these four, two are illustrated in the retracted (uppermost) position (typical of when the hood is being positioned or removed from its testing location) and two are illustrated in the extended (lowermost) test position (typical of when the testing is actually being performed). Since in preferred embodiment, probe assembly 130 is connected to Fuel Restrictor 150, movement of the Flow Restrictor 150 is controlled by the movement of the probe assembly 130. In another embodiment, the movement of Flow Restrictor 150 is independent of the probe assembly 130.

FIG. 6 shows the Fuel Assembly Mechanical Flow Restrictor Apparatus 100 in place over eight fuel assemblies, only one of which is shown in this view. The bottom edge of the testing hood side plates 108 rests on the reactor top guide structure 54. The top of the fuel assembly flow channel 22 protrudes a short distance (approximately 1 to 2 inches) above top guide structure 54. Once the testing hood 102 of the Fuel Assembly Mechanical Flow Restrictor Apparatus is positioned over the fuel assemblies to be tested, pressurized air is directed to the inside of testing hood 102 through a bubble supply line 138. The pressurized air supply displaces the water inside testing hood 102 until the water level inside the hood is below the top of the fuel assembly flow channels 22.

The air pressure within the hood of prior art devices is not sufficient to limit or preclude the flow of coolant through the fuel assembly and within the channel and from exiting the fuel assembly over the top edge of the channel. Although attempts could be made to increase the air pressure within the hood in an attempt to preclude flow exiting through the fuel assembly, the hood weight would have to be increased so that it maintains its position in contact with the top face of the upper guide structure. However, the degree of the needed weight increase could not be supported by the top guide structure. In addition, merely increasing the air pressure within the hood of prior art devices and increasing the weight of the hood would result in the increase of air bubbling out or escaping from the hood between the lower edges of the hood and the top guide structure and not function to decrease the coolant flow through the assembly. Accordingly, the escape of the air from increasing the air pressure under the hood effectively limits the degree of air pressure of prior art devices. Thus, the present invention enables the testing of fuel assemblies during shutdown residual heat removal coolant flow through the fuel assemblies which cannot be accomplished by prior art devices because (a) the residual heat removal coolant flow rate would lift the sipping device off the top of the top guide structure or (b) more importantly, the residual heat removal flow rate would cool the fuel rods precluding the effective detection of an escaped gas and therefore a fuel rod failure.

Positioning the bottom edge of side plates 108 on the reactor top guide structure over the eight fuel assemblies to be tested isolates the reactor coolant flow of each fuel assembly positioned under the hood 102 by allowing the coolant flow to rise in each fuel assembly, and to spill over the top of each of the fuel assembly flow channels, which is encompassed by the gas bubble created within the testing hood 102.

Once the coolant flow through each of the fuel assemblies is so isolated from each other, pressurized air is provided to the air cylinder assembly 112 causing the probe assembly 130 to be lowered onto the top of each fuel assembly located inside the testing hood assembly. The probe assembly, in its fully extended position, seats a sealing plate 152 of the Flow Restrictor 150 on the top edges of the fuel assembly flow channel 22. The position of one probe assembly 130 and Flow Restrictor 150 in relation to a fuel assembly being tested is shown in the enlarged view depicted in FIG. 7.

Figure 8A:
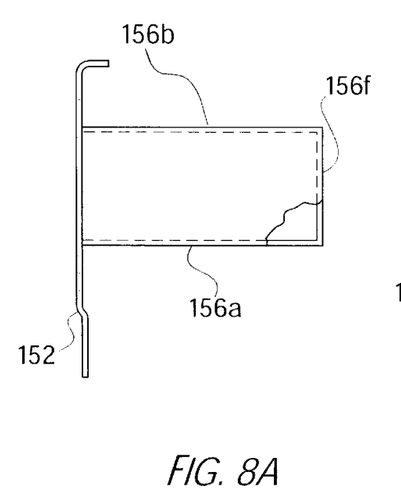
FIGS. 8A, 8B, 8C are side, top, and elevational views of one of the Flow Restrictors shown in FIG. 6.
Figure 8B:
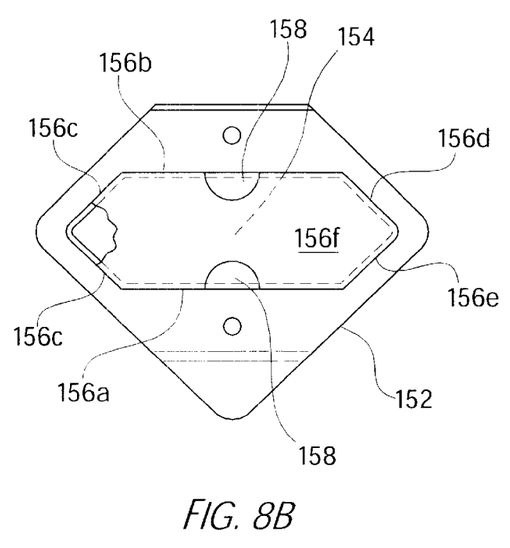
Figure 8C:
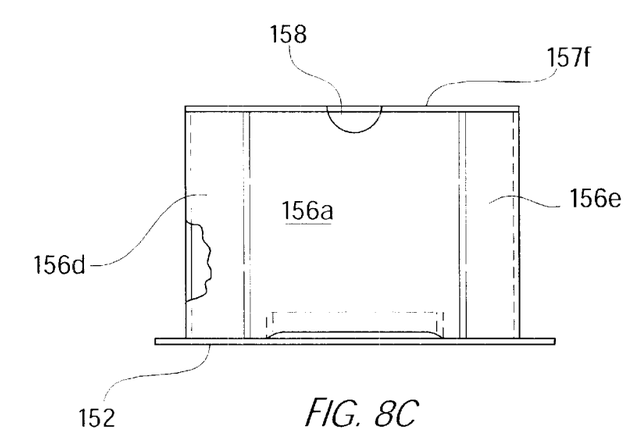

Flow Restrictor 150 shown in FIG. 7 consists of a sealing plate 152 and a Flow Restrictor bail cavity structure 154 consisting of metal plates 156*a, b, c, d, e, f,* connected or welded together to form an air/water tight structure except for the fission product escape ports 158 located on plates 156*a, b, f.* These escape ports transport fission product gases from a failed fuel rod to the open volume under the testing hood 102. (FIGS. 8A, 8B, 8C). One corner of sealing plate 152 is truncated to allow clearance for channel spring clip hardware 46 and the diagonally opposing corner is relieved to provide clearance with the flow channel gusset plate 48. The Flow Restrictor bail cavity structure 154 surrounds and encloses the fuel assembly bail 44 The structure of Fuel Assembly Mechanical Flow Restrictor Apparatus 150 is further shown in FIGS. 8A, 8B and 8C.

With Flow Restrictor 150 in its fully extended (lowered) position and seated on the top edges of the fuel assembly flow channel 22 (as shown in FIG. 7), the coolant flow rising through the fuel assembly during reactor shutdown and refueling is blocked except for leakage. This forces the coolant inside the fuel assembly to reside within the fuel assembly for a longer period of time causing the fuel assembly to heat up due to the continuing heat being generated by the individual fuel assembly fuel rods. As the temperature of the coolant water within the fuel assembly increases, any fuel rods containing through-wall defects will expel fission gas and soluble fission products from the interior of the failed rods. The expelled gas rises in the coolant upward through the fuel assembly and into bail cavity structure 154 and which then collects in the testing hood assembly (as shown in FIG. 6). The expelled soluble fission products mix with the coolant present within the flow channel of that fuel assembly, and due to the rising axial temperature gradient created within the fuel assembly as a result of the positioning of Flow Restrictor 150, these fission products rise to the top to the fuel assembly.

Once thermocouple 136 within probe head 132 indicates that a specified predetermined temperature rise within fuel assembly 10 has been achieved due to the Flow Restrictor blocking coolant flow exiting the top of the fuel assembly, water samples from the two probe heads 132 are drawn from the upper area of each fuel assembly and transported via tubes 140 to the top of the spent fuel pool deck (FIGS. 5 and 7A) where it is tested using conventionally known electronic analyses equipment 142. Also, a gas sample is drawn from within the testing hood assembly (covering all fuel assemblies under the testing hood),and is also transported via gas sample line 144 to the top of the spent fuel pool deck (FIGS. 5 and 7A) where it is also tested with conventionally known analyses equipment.

Once the gas and water samples are collected and analyzed the test is completed. Once the gas and water samples are collected and analyzed from the last fuel. assembly to be tested by eight fold sipping hood 102, the testing of that fuel assembly and the seven other fuel assemblies already tested are complete. The Flow Restrictor 150 and probe assembly 130 are retracted (raised) to its full upright position within the hood. The air pressure which formed the gas bubble within the testing hood assembly is released, and the void within the hood fills again with reactor coolant water. The testing hood assembly is then lifted off the top guide structure high enough to clear the fuel assembly bails, and is repositioned over the next set of fuel assemblies to be tested.

While the present invention has been particularly shown nd described with reference to preferred embodiments thereof, it will be understood by those skilled in the art that various changes in form and details may be made therein without departing from the spirit and scope of the invention.

What is claimed is:

1. A fuel assembly mechanical flow restriction apparatus for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising:

a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure;

a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly;

a probe assembly having at least one probe head with at least one thermocouple for sampling the coolant water within the fuel assembly for detecting failure of a nuclear fuel rod in the nuclear fuel assembly;

means for causing the sealing plate of the flow restrictor to be positioned on the upper edges of the outer channel of the fuel assembly for mechanically blocking fuel assembly coolant flow from exiting the upper end of the fuel assembly and for causing the probe head to be immersed in the fuel assembly reactor coolant water within the outer channel wherein the means for causing the sealing plate to be positioned on the outer channel of the fuel assembly is hydraulic.

2. A fuel assembly mechanical flow restriction apparatus for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising:

a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure;

a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly;

a probe assembly having at least one probe head with at least one thermocouple for sampling the coolant water within the fuel assembly for detecting failure of a nuclear fuel rod in the nuclear fuel assembly;

means for causing the sealing plate of the flow restrictor to be positioned on the upper edges of the outer channel of the fuel assembly for mechanically blocking fuel assembly coolant flow from exiting the upper end of the fuel assembly;

and means for causing the probe head to be immersed in the fuel assembly reactor coolant water within the outer channel wherein the means for causing the sealing plate to be positioned on the outer channel of the fuel assembly and for causing the probe head to be immersed in the fuel assembly reactor coolant water within the outer channel is hydraulic.

3. A fuel assembly mechanical flow restriction apparatus for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising:

a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure;

a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly;

a probe assembly having at least one probe head with at least one thermocouple for sampling the coolant water within the fuel assembly for detecting failure of a nuclear fuel rod in the nuclear fuel assembly;

means above the top plate of the testing hood for causing the sealing plate of the flow restrictor to be positioned on the upper edges of the outer channel of the fuel assembly for mechanically blocking fuel assembly coolant flow from exiting the upper end of the fuel assembly and for causing the probe head to be immersed in the fuel assembly reactor coolant water within the outer channel wherein the means above the top plate of the testing hood for causing the sealing plate to be positioned on the outer channel of the fuel assembly is hydraulic.

4. A fuel assembly mechanical flow restriction apparatus for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising:

a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure;

a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly;

a probe assembly having at least one probe head with at least one thermocouple for sampling the coolant water within the fuel assembly for detecting failure of a nuclear fuel rod in the nuclear fuel assembly;

means above the top plate of the testing hood for causing the sealing plate of the flow restrictor to be positioned on the upper edges of the outer channel of the fuel assembly for mechanically blocking fuel assembly coolant flow from exiting the upper end of the fuel assembly;

and means above the top plate of the testing hood for causing the probe head to be immersed in the fuel assembly reactor coolant water within the outer channel wherein the means above the top plate of the testing hood for causing the sealing plate to be positioned on the outer channel of the fuel assembly and for causing the probe head to be immersed in the fuel assembly reactor coolant water within the outer channel is hydraulic.

5. A fuel assembly mechanical flow restriction apparatus for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising:

a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure;

a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly;

a probe assembly having at least one probe head with at least one thermocouple for sampling the coolant water within the fuel assembly for detecting failure of a nuclear fuel rod in the nuclear fuel assembly;

raising and lowering means for causing the sealing plate of the flow restrictor to be positioned on the upper edges of the outer channel of the fuel assembly for mechanically blocking fuel assembly coolant flow from exiting the upper end of the fuel assembly and for causing the probe head to be immersed in the fuel assembly reactor coolant water within the outer channel wherein the raising and lowering means for causing the sealing plate to be positioned on the outer channel of the fuel assembly is hydraulic.

6. A fuel assembly mechanical flow restriction apparatus for detecting failure of a nuclear fuel rod in a nuclear fuel assembly situated in a reactor core of a boiling water reactor, the reactor core comprising a plurality of nuclear fuel assemblies comprising parallel fuel rods supported at an upper end by an upper tie plate and an outer channel surrounding the fuel rods for the passage of reactor coolant from a lower end to the upper end of the fuel assembly, the outer channel having upper edges, the upper end of the fuel assembly passing through and being supported by a reactor core top guide structure, the fuel assembly mechanical flow restriction apparatus comprising:

a testing hood comprising a top plate and side plates to form a structure with an open bottom forming an internal volume for positioning over the tops of at least one of the nuclear fuel assemblies and for receiving gases escaping from a failed fuel rod within the fuel assembly, the side plates for resting on the reactor core top guide structure;

a flow restrictor positioned within the testing hood and over at least one of the nuclear fuel assemblies, the flow restrictor comprising a sealing plate for positioning on the upper edges of the outer channel of the fuel assembly for mechanically blocking fuel assembly coolant flow exiting the upper end of the fuel assembly;

a probe assembly having at least one probe head with at least one thermocouple for sampling the coolant water within the fuel assembly for detecting failure of a nuclear fuel rod in the nuclear fuel assembly;

raising and lowering means for causing the sealing plate of the flow restrictor to be positioned on the upper edges of the outer channel of the fuel assembly for mechanically blocking fuel assembly coolant flow from exiting the upper end of the fuel assembly;

and raising and lowering means for causing the probe head to be immersed in the fuel assembly reactor coolant water within the outer channel wherein the raising and lowering means for causing the sealing plate to be positioned on the outer channel of the fuel assembly and for causing the probe head to be immersed in the fuel assembly reactor coolant water within the outer channel is hydraulic.

* * * * *